United States Patent [19]

Farnsworth

[11] 4,159,873
[45] Jul. 3, 1979

[54] RANGEFINDER AND DIGITAL SINGLE SHOT CIRCUIT

[75] Inventor: Robert P. Farnsworth, Los Angeles, Calif.

[73] Assignee: Hughes Aircraft Company, Culver City, Calif.

[21] Appl. No.: 836,937

[22] Filed: Sep. 27, 1977

[51] Int. Cl.$^2$ ............... G01C 3/08; H03K 3/30; H03K 3/10

[52] U.S. Cl. .................. 356/5; 307/273; 307/276; 307/232; 307/234; 328/207; 343/13 R

[58] Field of Search ............ 307/273, 276, 232, 234; 328/207; 356/5; 343/13 R

[56] References Cited

U.S. PATENT DOCUMENTS

| | | | |
|---|---|---|---|
| 3,545,861 | 12/1970 | Farnsworth et al. | 356/5 |
| 3,576,496 | 4/1971 | Garagnon | 328/207 |
| 3,666,367 | 5/1972 | Farnsworth et al. | 356/5 |
| 3,721,906 | 3/1973 | Geesen et al. | 307/234 |
| 3,768,026 | 10/1973 | Pezzutti | 307/265 |
| 3,790,821 | 2/1974 | Adamson | 307/273 |
| 3,853,402 | 12/1974 | Nichols | 356/5 |
| 3,951,549 | 4/1976 | Fowler et al. | 356/5 |

Primary Examiner—S. C. Buczinski
Attorney, Agent, or Firm—E. N. Kramsky; A. M. Finkel; W. H. MacAllister

[57] ABSTRACT

This invention is an improved ranging system including an improved digital single shot circuit that has a resettable shift register therein so that a signal representative of the last target return occurring at any point of a predetermined range interval will be provided to the timing counter of the system. The digital single shot circuit includes a flip flop responsive to the first trigger pulse during the predetermined range interval, resetting the shift register so that, when the output pulse from the shift register representing the last target return is applied to the timing counter, it will terminate a fixed number of clock edges after the last trigger pulse determined by the number of stages of the shift register. The fixed delay in terminating the output of the shift register may represent the preset time of the readout counter.

11 Claims, 6 Drawing Figures

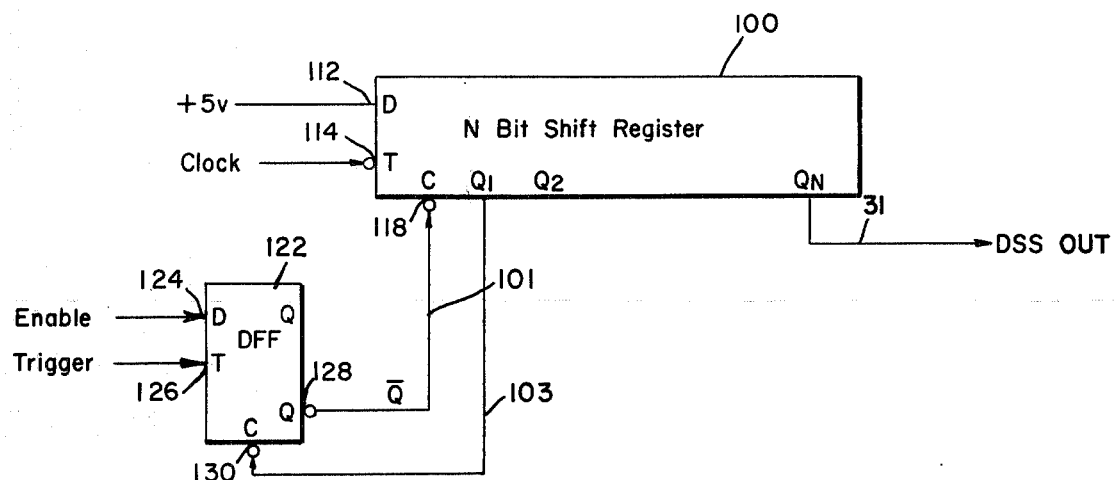
Fig. 3.
Fig. 4.
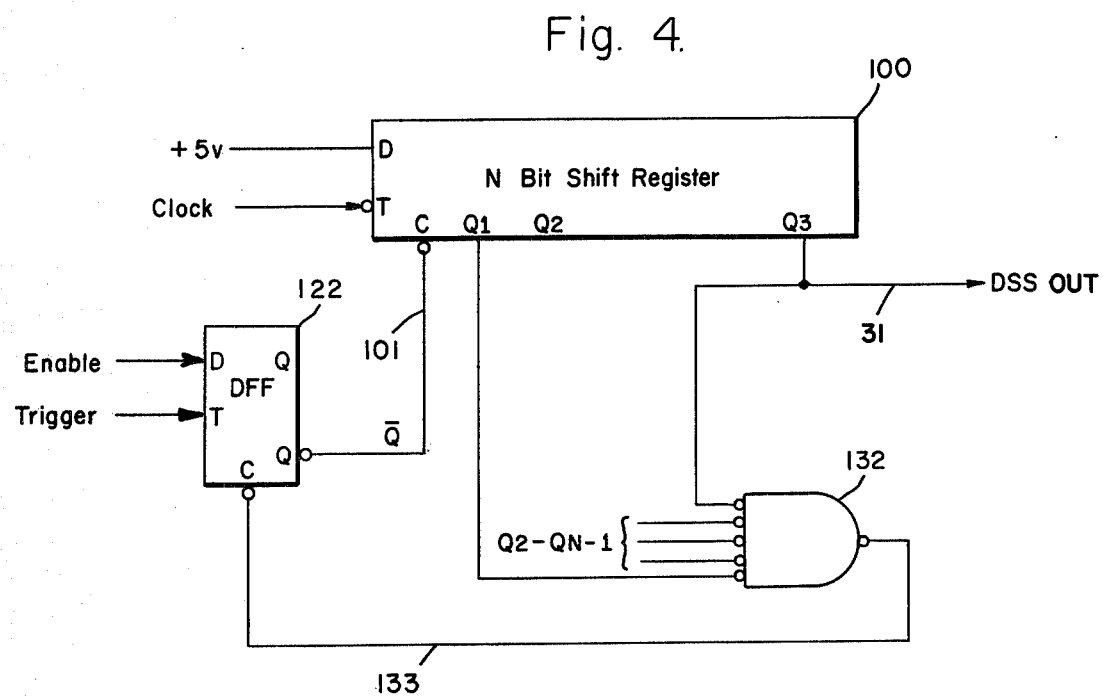

RANGEFINDER AND DIGITAL SINGLE SHOT CIRCUIT

BACKGROUND OF THE INVENTION

This invention relates to an improved ranging system including an improved digital single shot circuit that is gateable, non-blocking and retriggerable.

In previous ranging systems such as the last reply ranging system of U.S. Pat. No. 3,545,861, which utilizes the equivalent of a timing counter and a readout counter, the accuracy of the last target determination is limited as a result of the employment of an analog single shot circuit to reset the system's range counter. In that system, the range counter is reset each time a signal representative of a target return signal is applied thereto, to produce the complement of the target range when a control counter reaches its maximum count. If the last target return was received by the above referenced system during a portion of the interval that the range counter was resetting, the return would not be counted by the control counter. In the improved last reply ranging system of the invention, any target return received by the system will reset the timing counter because the improved digital single shot circuit which includes a shift register, provides a delay between the last target return and the termination of the reset pulse that is a selected number of clock pulses representative of the number of stages of the shift register. For purposes of this invention, a digital single shot circuit is a circuit in which a triggering pulse initiates one complete cycle of conditions after the occurrence of a given number of clock pulses, ending with a stable condition.

SUMMARY OF THE INVENTION

An improved ranging system including a digital single shot circuit in accordance with the invention incorporates the counter concept of the last reply ranging system of U.S. Pat. No. 3,545,861. The system of the invention incorporates a transmitter, which, for example, may be a laser transmitter, a timing counter, a readout counter, and an improved digital single shot circuit. When the transmitter transmits an energy pulse, the timing and readout counters start counting. When the timing counter reaches its maximum count, both counters will stop counting at which time the count state of the readout counter will corresponds to the range of either the first or last target reply received during an enabling pulse interval. If the range of the first target, after the digital single shot (DSS) circuit has been enabled is to be determined, the enable pulse will be terminated upon receipt of the first target return. If the range of the last target is desired, the enable pulse will terminate when the readout counter reaches a predetermined count representative of the maximum target range.

The digital single shot circuit develops pulses representative of target returns to continually reset the timing counter so that the timing counter will only reach its maximum count after a period of time has elapsed, corresponding to its count capability, in which no target replies have been received. A predetermined duration of the reset pulse is provided to accommodate the reset time of the timing counter. Since the termination of the reset pulse always occurs after a fixed number of clock edges following the leading edge of the last enabled target return in the last return mode, the system provides high accuracy for all target returns received by the system during the enable period of the digital single shot circuit.

The improved digital single shot circuit in accordance with the invention incorporates an N bit shift register and a flip flop such as a D type. The shift register has a clock terminal and a data terminal which are respectively triggered by clock signals and by a fixed voltage representing a logic 1, for example, so that, in response to each clock pulse, a logic 1 is entered into the first stage of the shift register. The flip flop has enable and trigger terminals so that when an enable signal is present at the enable input terminal, the first trigger pulse during a clock interval applied to the flip flop will cause it to be "set", which in turn will clear all stages of the shift register. When the first stage is cleared, a signal is fed back to the clear terminal at the flip flop. Alternatively, all the stages of the shift register must be AND'ed together and the resultant signal used to clear the flip flop. Thus, the shift register provides an output pulse to the timing counter having a width equal to a selected number of clock periods after the last time that the shift register was reset by the flip flop. The various stage outputs of the shift register provide pulses of predetermined lengths depending on which output stage is chosen. The circuit when enabled can be retriggered during any clock pulse period so that the termination of the output pulse occurs in response to the number of clock edges equal to the number of stages of the shift register plus the number of preceding clock edges that have occurred without a trigger pulse being received during that digital single shot pulse interval.

Accordingly, it is an object of the present invention to provide a ranging system including an improved digital single shot circuit that is capable of accurately responding to multiple targets without any substantial limitation on minimum spacing between successive targets.

It is another object of the present invention to provide an improved ranging system including an improved digital single shot circuit that allows the timing counter to be slow to reset and will respond during any clock pulse.

It is a further object of the invention to provide an improved first reply ranging system including a digital single shot circuit that is relatively simple in construction and yet reliable in operation.

It is still a further object of the invention to provide an improved last reply ranging system including a digital single shot circuit that is relatively simple in construction and yet reliable in operation.

It is still a further object of the invention to provide an improved digital single shot circuit which is gateable such that the trigger function can be inhibited or enabled in response to an external logic signal, and that is also non-blocking, and retriggerable.

BRIEF DESCRIPTION OF THE DRAWINGS

The novel feature of this invention, as well as the invention itself, its method of organization and method of operation will be best understood from the accompanying descriptions taken in connection with the accompanying drawings in which like reference characters refer to like parts and which:

FIG. 3 is a schematic diagram illustrating a digital single shot circuit in a first arrangement in accordance with the invention;

FIG. 4 is a schematic diagram of another arrangement of the digital single shot circuit in accordance with the invention;

DESCRIPTION OF THE PREFERRED EMBODIMENTS

Figure 1:
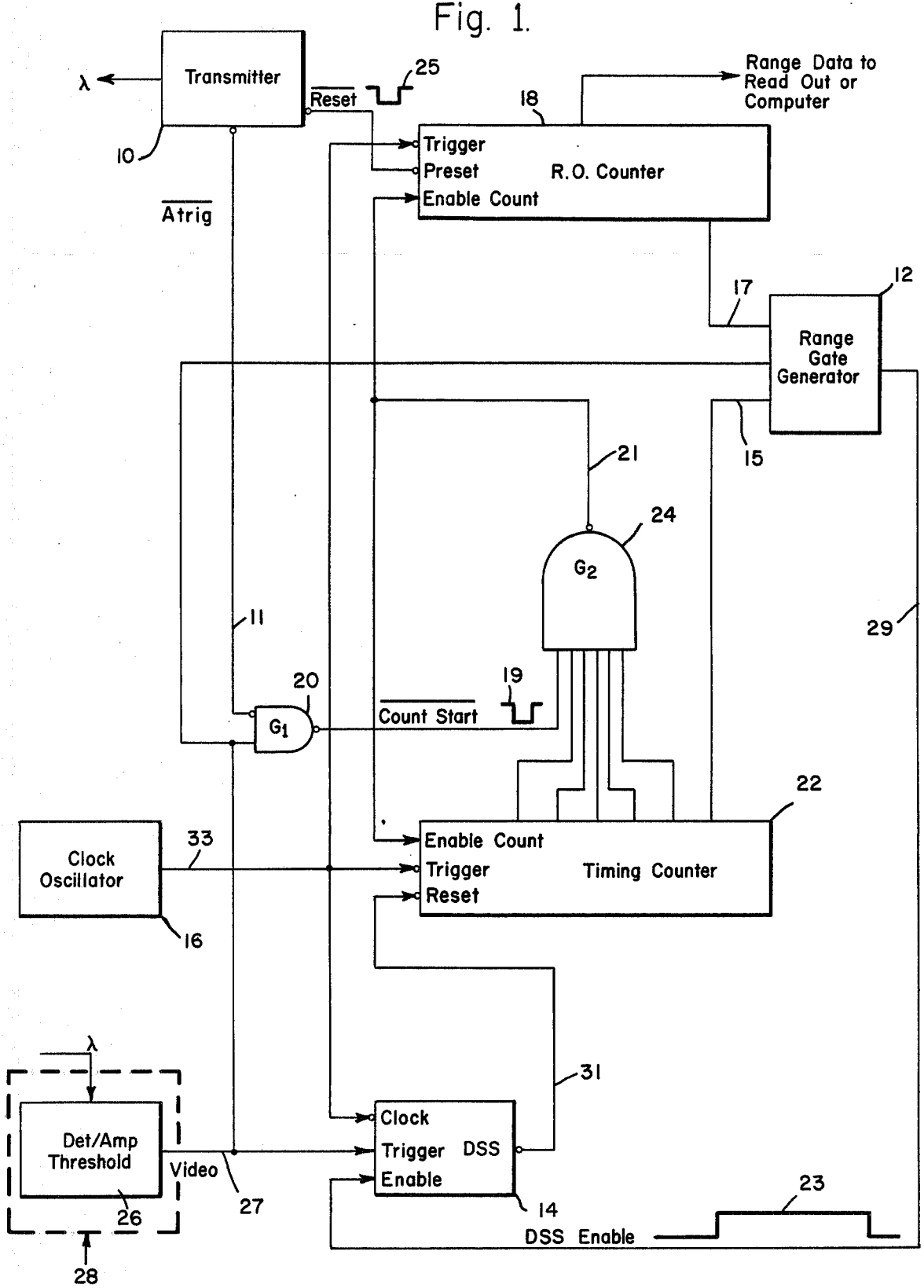
FIG. 1 is a schematic diagram of a digital ranging system employing a digital single shot, all in accordance with the invention.

Referring first to FIG. 1, a digital ranging system illustrated as a laser ranging system is shown utilizing an improved digital single shot circuit in accordance with the invention. The digital single shot circuit incorporates a transmitter 10 which delivers a pulse of energy towards a remote target and a receiver 28 which detects the energy reflected by the remote target. The transmitter 10 is coupled to a readout counter 18 and provides a reset pulse occurring prior to energy transmission to preset the readout counter 18. The transmitter 10 also develops an $\overline{ATRIG}$ pulse occurring simultaneously with energy transmission which is supplied through lead 11 to an AND gate 20 also indicated as $G_1$. The receiver 28 includes detecting means such as a Detector/Amplifier threshold circuit 26 which is coupled through a lead 27 to a digital single shot circuit 14 to provide a VIDEO pulse thereto. The lead 27 is also coupled to the AND gate 20 so that when both a VIDEO pulse from the Detector/Amplifier threshold circuit 26 and an $\overline{ATRIG}$ pulse from the transmitter 10 are simultaneously present at AND gate 20, the gate 20 will cause a $\overline{COUNT\ START}$ pulse 19 to be gated through an AND gate 24 (also indicated as gate $G_2$) and cause the readout counter 18 and a timing counter 22 to start counting, through a lead 21. A clock oscillator 16 which is a source of clock pulses of a precision controlled frequency is coupled by a lead 33 to the readout counter 18 and the timing counter 22 to provide input trigger pulses to the two counters and to provide a clock signal for the shift register of the digital single shot (DSS) circuit 14. The period of the clock oscillator 33 or of the clock pulses may correspond to the determinable range increment of the system. For example a 15 mHz clock might represent 10 meters, and a 30 mHz clock might represent 5 meters. The readout counter 18 through a lead 17, the timing counter 22 through a lead 15, and the Detector/Amplifier threshold circuit 26 through the lead 27 are coupled to a range gate generator 12 whose circuit determines the period of time that target replies are to be processed by controlling the DSS enable signal of a waveform 23. The range gate generator may be conveniently mechanized as a pair of flip flops, a minimum range flip flop and a maximum range flip flop whose outputs are ANDed together to form the enable signal for the digital single shot circuit 14. The maximum range flip flop is normally low and the minimum range flip flop is normally high. The reset pulse 25 causes the two to change from their normal states, the minimum range flip flop providing a low input to the AND gate and the maximum range flip flop providing a high input to the AND gate. A pulse indicative of minimum range is produced some time thereafter, by a predetermined combination of the outputs of selected stages of the timing counter 22 and fed to the range gate generator 12 by means of the lead 15. This minimum range pulse causes the output of the minimum range flip flop of the generator 12 to go high. Thus, the ANDed outputs produce the leading edge of the enable or range gate signal transmitted along lead 29. At maximum range, the content of the readout counter 18 will produce a pulse which causes the maximum range flip flop to go low, terminating the high state or pulse output of the range gate generator 12. Thus, the "DSS Enable" signal 23 may be generated. The range gate generator 12 at a predetermined count of the timing counter 22 representative of minimum range or round trip energy travel time, will send the DSS enable signal 23 to the digital single shot circuit 14 through a lead 29 to enable it to respond to target reply signals which are triggered by the Detector/Amplifier circuit 26 and if a last reply target is desired, it will disable the digital single shot circuit 14 at a time corresponding to a predetermined count of the readout counter 18 representative of maximum range (or round trip energy travel time). The digital single shot circuit 14 is coupled by a lead 31 to the timing counter 22 and provides a clear or reset pulse, the circuit 14 being responsive to target reply signals during the enable period of the waveform 23 created by the range gate generator 12. In the last reply modes the reset signal terminates after a fixed number of clock pulses past the clock period during which the last target signal was received determined by the number of bit stages of the digital single shot circuit 14. The timing counter 22 has its binary count values coupled to the AND gate 24 which has its output terminal coupled by the lead 21 to both the readout and the timing counters. The gate 24 will enable counting to take place in both counters whenever the $\overline{COUNT\ START}$ signal goes low if the timing counter 22 has attained its maximum count or when the timing counter 22 is not at a full count. When the timing counter 22 is at a full count and the $\overline{COUNT\ START}$ signal is not present, the gate 24 will cause both counters to stop counting and cause the readout counter 18 to provide range information of the last target.

Figure 2:
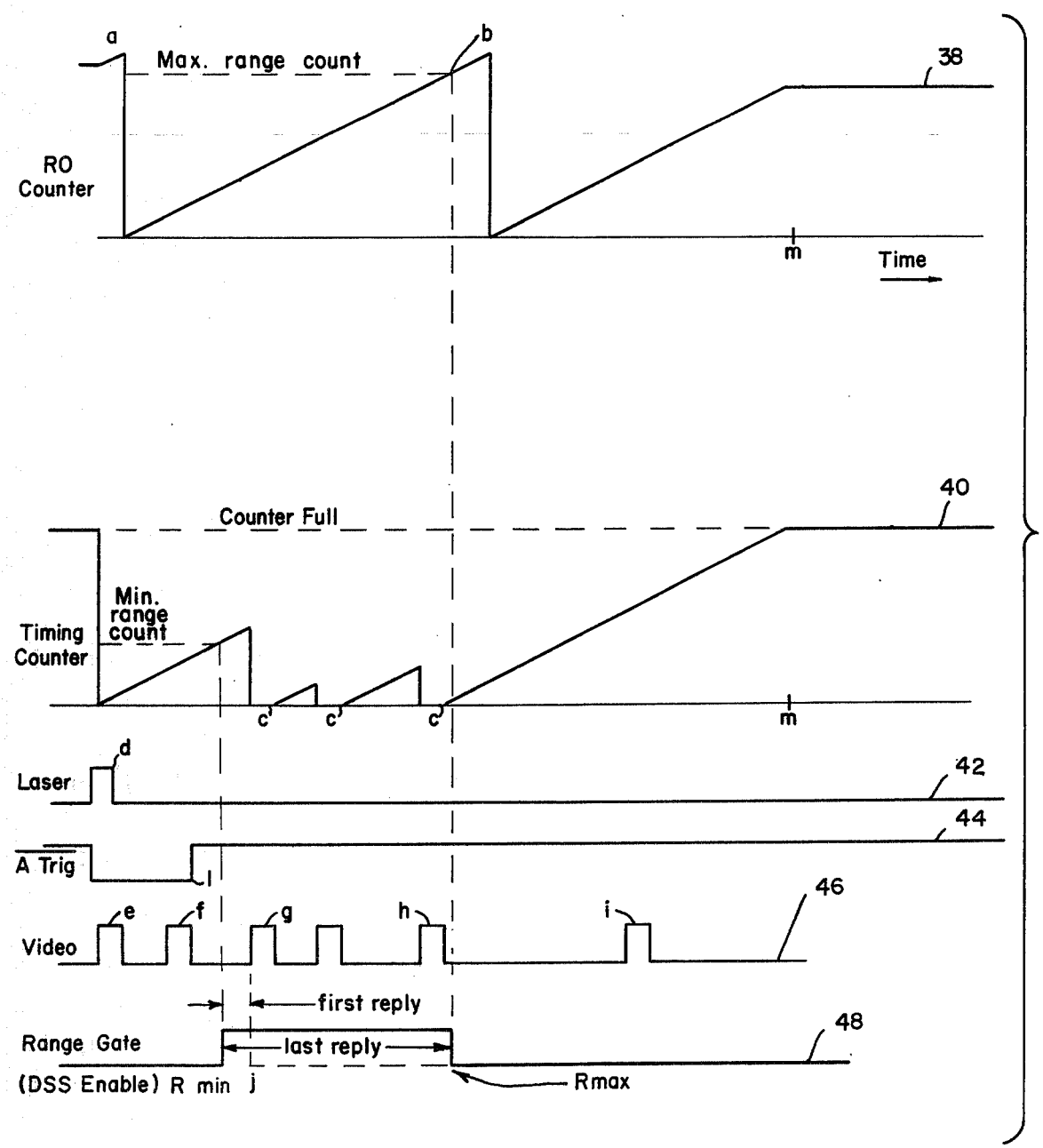
FIG. 2 is a schematic diagram showing waveforms of voltage and accumulated (analog) count or counter states as a function of time for explaining the system of FIG. 1.

Reference will now be made to FIG. 2 for further explanation of the operation of the ranging system of FIG. 1. Prior to transmission of the laser pulse, a pulse shown as a waveform 25 in FIG. 1 is generated in the transmitter 10 to preset the readout counter 18, to zero or to a non-zero value (the presetting of the readout counter 18 to a non-zero value may act as a correction if, for instance, the readout and timing counters are not both binary, (B.C.D., etc.) in FIG. 2. A laser pulse shown as a pulse d of a waveform 42 is then generated by the transmitter 10 and is transmitted towards a target. Concurrently the trigger signal $\overline{ATRIG}$ shown as a pulse 1 of a waveform 44 is also generated by the transmitter 10. A portion of the transmitted laser light is picked up by the Detector/Amplifier (Det/Amp) threshold circuit 26 of the receiver 28 and, after inherent circuit delays, a VIDEO signal shown as pulse e of a waveform 46 is applied to the output thereof. The simultaneous occurrence of the $\overline{ATRIG}$ and VIDEO signals causes the $\overline{COUNT\ START}$ signal 19 to pulse low, as a result of which the output of gate 24 goes high, enabling the counting functions of both the readout counter 18 and the timing counter 22. Each stage of the timing counter 22 is in the set or logic 1 condition such that the first enabled clock pulse from the clock oscillator 16 will toggle the entire counter to the zero state. Logic 0 inputs will thus be provided to one or more inputs of the AND gate 24 causing the enable count signal to be maintained at a high state at the output of gate 24 until the maximum count or all stages set condition is once again achieved in the timing counter 22 shown at time m of the waveform 40 of FIG. 2. The range gate generator 12 is responsive to the accumulated count in both counters. The range gate generator will provide a DSS 14 enable signal of a waveform 48 in FIG. 2 when the timing counter reaches a predetermined count representing the minimum desired range shown by a Min Range Count of a waveform 40 corresponding to $R_{MIN}$ of waveform 48 and which may terminate when the readout counter reaches a predetermined count representing a maximum desired range shown by Max Range Count b of the waveform 38 corresponding to $R_{MAX}$ of the waveform 48. In the first reply mode the DSS enable signal terminates at the dotted edge (j) after receipt of the first enabled (target) pulse illustrated as target pulse g of waveform 46. In the last reply mode the DSS enable pulse terminates at the end of the maximum range period when the maximum range flip flop of the range gate generator 12 changes state upon receipt of a signal from the readout counter 18. In the last reply, the target pulse received during the DSS enable high state will be readout on the readout counter 18. In the example of FIG. 2 the laser energy reflected by various targets enters the Det/Amp threshold circuit 26 which generates VIDEO signals f-i of the waveform 46 in FIG. 2 for every target reply received but VIDEO pulses e, f and i do not activate the digital single shot 14 when the digital single shot enable signal is not high upon VIDEO receipt. In the first reply mode, VIDEO waveform g of the waveform 46 in FIG. 2 is the target return whose range eventually appears in the readout counter 18. In the last replay mode the range of VIDEO pulse h of waveform 46 of FIG. 2 will be recorded in would be readout of the readout counter.

When a DSS enable signal is present the VIDEO signal triggers the digital single shot to reset or clear the timing counter for the duration of the pulse $\overline{DSS\ OUT}$ applied to the reset terminal of the timing counter 22 by the lead 31. The duration of the $\overline{DSS\ OUT}$ pulse is mirrored by the length of the zero count intervals of the timing counter 22 labeled c in waveform 40. The number of bit stages of the shift register of the digital single shot circuit 14 should be choosen in accordance with the reset time of the timing counter 22 (which may be a ripple counter involving low speed counter stages). Since the number of stages so that the timing counter 22 may fully reset to a zero count before initiating a new counting sequence of the digital single shot circuit 14 is fixed, the delay in restarting the counting process in the timing counter 22 may be compensated by the choice of a non-zero preset count in the readout counter 18 illustrated by amplitude a in the waveform 38.

For example, if one SN54LS197 binary ripple counter followed by a CD4040A CMOS ripple counter were used together to form a 16 stage timing circuit, 22 the clock frequency associated with the system is 15 mHz. Therefore, the frequency going into the CMOS device (CD4040A) is less than 1 mHz and is therefore compatible with present CMOS technology. The minimum guaranteed reset time for the CMOS device is 1.25 μsec. Therefore a minimum digital single shot pulse $\overline{DDS\ OUT}$ width greater than 1.25 μsec. is required when using the 15 mHz clock, which can be accomplished using a 19 or greater bit stage shift register described infra in the digital single shot 14. Thus a 20 bit shift register would be chosen. The full count of the timing counter is $2^{16}$. Since each count corresponds to 10 meters, if a minimum range of 200 meters were chosen, the first time the fifth bit of the timing counter 22 goes high and the 3rd bit of the timing counter 22 goes high, these two binary signals, ANDed together and thereby applied to the minimum range flip flop of the range gate generator 12, will determine the minimum range of the range gate generator.

Referring now to FIG. 3, the improved digital single shot circuit 14 of FIG. 1 in accordance with the invention is comprised of an N bit shift register 100 and a flip flop 122 which in the illustrated example is a D flip flop. A D flip flop is a bistable logic element in which the state of the flip flop is determined by the state of the D (data) input, at the time of the activating clock edge of the trigger.

The N bit shift register 100 has a clock input terminal 114 and a data input terminal 112 which are respectively responsive to external sources (FIG. 1) of clock signals and to data signals, +5 volts representing a continuous binary 1. The shift register 100 also has a reset or clear terminal 118 which receives a reset signal $\overline{Q}$ through a lead 101 from a terminal 128 of the flip flop 122. In this illustrated arrangement, the clear terminal is a common terminal for coupling to the clear or reset terminals for all stages of the shift register 100, but in some shift registers, each stage may have its own clear terminal externally coupled at a terminal to the lead 101. The flip flop 122 has a clear terminal 130 which is enabled through a lead 103 as a function of the shift register 100 being reset or cleared. The flip flop 122 also has an enable-data (D) input terminal 124 and a trigger (T) input terminal 126 responsive to external sources (FIG. 1) of enable and trigger signals, respectively. The circuit operates such that when an enable signal is present at the D input 124 of the D flip flop 122, the leading edge of each trigger pulse 126 applied to the D flip flop will "set" the D flip flop, in turn clearing all of the (normally set) stages of the shift register 100. The zero output of the first binary stage of the shift register 100 in the illustrated circuit then in turn clears the D flip flop. The flip flop 122 of the digital single shot circuit 14 is prepared to be triggered in like manner by the next incoming VIDEO pulse. Thus, the circuit 14 is seen to be non-blocking and independent of the interpulse spacings of the VIDEO signal. The outputs of the various stages of the N bit shift register 100 provide downgoing pulses DSS OUT of length determined by the stage of the selected output; e.g., $Q_N$, $N^{th}$ stage of the shift register 100 produces an output pulse which terminates at the $N^{th}$ clock edge past period during which triggering occurred, $Q_1$ produces an output pulse until the first clock edge following DSS triggering, etc. The object of the circuit 14 is to provide a timing counter 22 rest pulse DSS OUT on a lead 31 which will terminate on the $N^{th}$ clock pulse following receipt of the last VIDEO pulse while the circuit 14 is enabled pulse regardless of time between successive VIDEO (trigger) pulses applied to the flip flop 122.

The digital single shot circuit of FIG. 4 is similar to that of FIG. 3 in that it utilizes the D flip flop 122 and the N bit shift register 100 but varies by including an additional element. An AND gate 132 is connected to the outputs of all stages of the shift register 100 in order to clear the D flip flop 122 through a lead 133 only when each output stage illustrated by $Q_1$ through $Q_N$ of the shift register 100 has been cleared.

The circuits of FIGS. 3 and 4 operate such that whenever a VIDEO pulse is applied to the T input of the D flip flop 122, the D flip flop will set if enabled by the high stage of the output of the range gate generator 12. If a 54S74 element is used for the D flip flop 100, the D flip flop will be toggled or set by a positive transition of the trigger pulse. When the D flip flop is toggled, the state of its Q output goes high (the same logic state as is presented its D (data) input. In the circuit of FIG. 4, the outputs of each of the N stages must be cleared before the D flip flop is allowed to be reset.

In the circuit of FIG. 3, advantage is taken of the uniformity of clear time of individual registers of the shift register, such that only $Q_1$ needs to be sensed in clearing the D flip flop. The circuit of FIG. 3 will operate satisfactorily whenever the uncertainty in clear time within the shift register at a given temperature is less than the clear time of the D flip flop.

The N bit shift register 100 used in FIGS. 3 and 4 includes N elements where each element has the capability that the output binary state following a clock pulse corresponds to the data input binary state at the time of the clock pulse. For example, the shift register in accordance with the invention may be a series of D flip flops, JK flip flops, or charge coupled device elements, photon coupled bistable circuits or any other suitable type of storage elements.

There are primarily two types of shift registers that can be used for the N bit shift register 100, a serial in, serial out shift register and a serial in, parallel out shift register. The serial in, serial out shift register is utilized when the output is derived from the last stage. A serial in, parallel out shift register is utilized when the output may be derived from other than the last stage.

Figure 5:
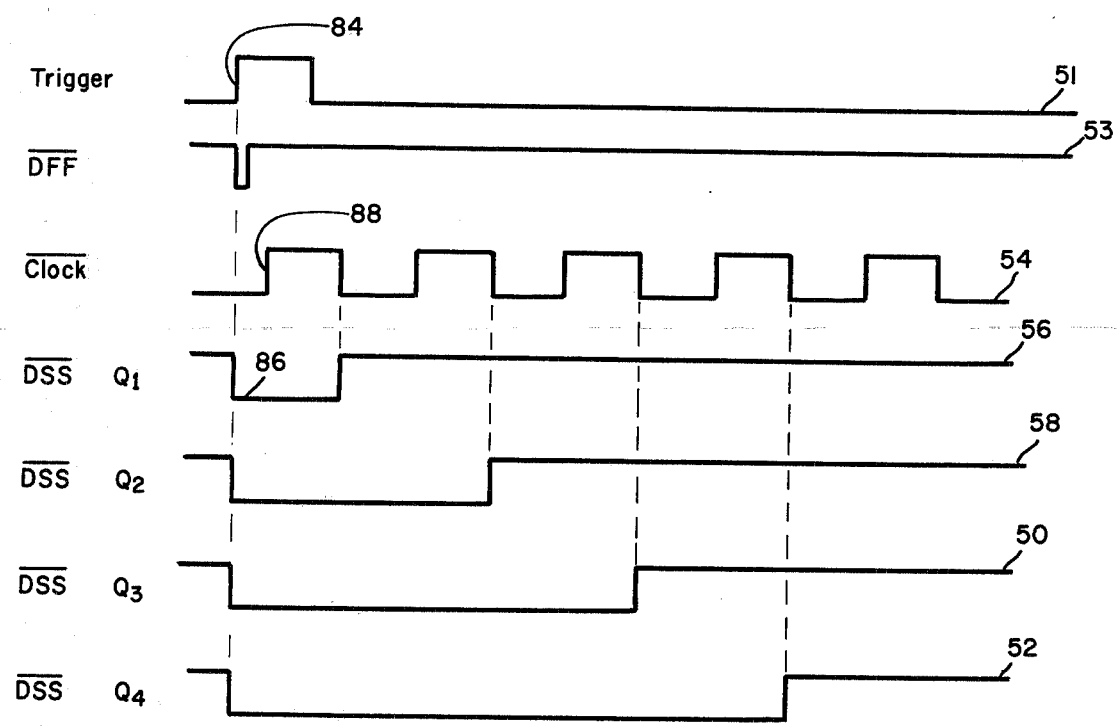
FIG. 5 is a schematic diagram of waveforms showing voltages as a function of time for explaining the operation of the digital single shot circuits of FIGS. 3 and 4 for a single received target or trigger pulse.

The waveforms of FIG. 5 illustrate the operation of the digital single shot circuits of FIGS. 3 and FIG. 4 for a single target return. The activating or rising edge 84 of the trigger pulse of a VIDEO waveform 51 causes the D flip flop 122 to set driving $\overline{DFF}$ waveform 53 (the complementing output $\overline{Q}$ of the flip flop) low which in turn causes the normally high $Q_1$-$Q_N$ waveforms to go into a low logic state as the shift register stages are cleared or reset. Waveforms 56, 58, 50 and 52 illustrate the states $Q_1$-$Q_4$ of the four stages of a four stage shift register. It is to be noted that the $Q_2$-$Q_4$ waveforms illustrate the signals of the later stages of the shift register 100 that will be derived from the $Q_1$ signal stored in the first stage of the shift register. The $Q_1$ signal goes low as shown by a lower level 86 of the waveform 56 from the time of the activating edge 84 of the VIDEO (trigger) waveform 51 to the time of the 1$^{st}$ downgoing edge of a clock pulse applied to the shift register 100 by the clock oscillator 16 illustrated as the downgoing edge 88. The duration of the set condition of the flip flop 122 is determined only by the response speed of the flip flop 122 and of the shift register 100 and is independent of the clock 16 as the first (normally set) stage of the shift register 100 is cleared solely by the downgoing Q of the flip flop 122. The flip flop 122 is cleared by the feedback of a downgoing edge from $Q_1$ via lead 103. The first stage of the shift register 100 remains low until a negative going clock edge is applied to the shift register 100. The D input of the first stage, $Q_1$, of the shift register 100 is held high (connected to +5v), to enter 1's into the stages of the register 100 upon successive clock pulses. The next negative going edges of a clock pulse which is at the end of the clock interval during which the first stage was cleared, causes the Q output of the shift register to go to the 1 state.

Figure 6:
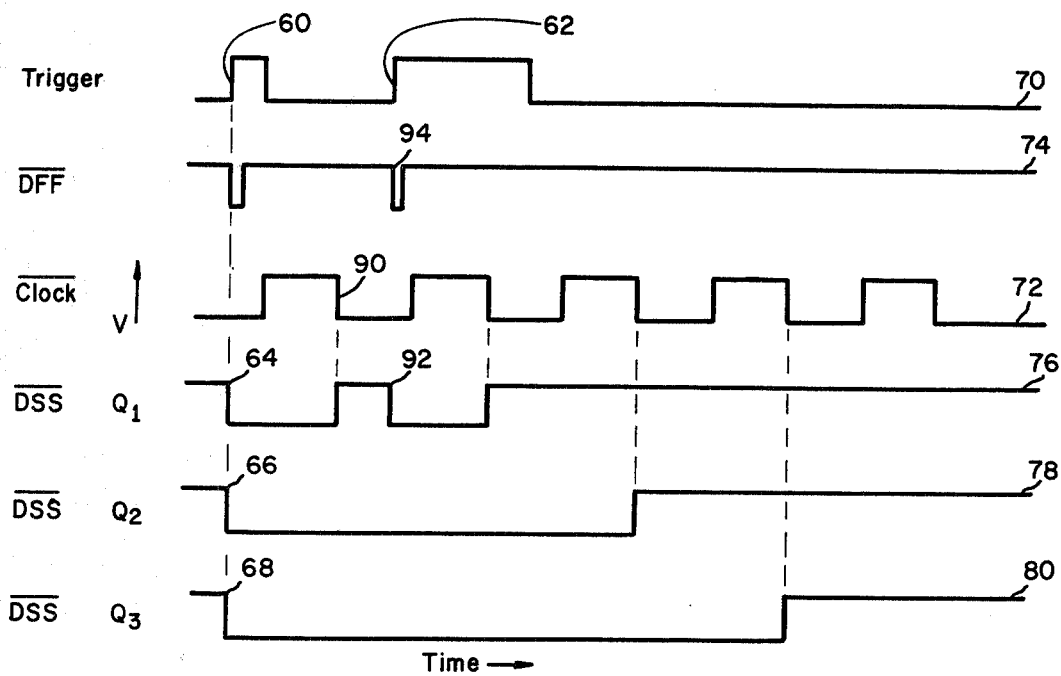
FIG. 6 is a schematic diagram of waveforms showing voltage as a function of time for explaining the operation of a digital single shot circuit of FIGS. 3 and 4 for two or more received target or trigger pulses.

The waveforms of FIG. 6 illustrate the operation of a digital single shot circuit 14 according to FIG. 3 or FIG. 4 in a last return mode. That is, the circuit 14 is not disabled by the range gate generator 12 upon receipt of a first VIDEO pulse. Two or more targets having leading edges 60, 62 are indicated by the receipt of two VIDEO (trigger pulses from the receiver 28. Positive going edge 60 of the first received pulse of waveform 70 causes the enabled flip flop 122 to set as shown by the pulsing down of the waveform 74 (the $\overline{Q}$ output of the flip flop 122). The signal applied to the clear terminal of the normally set shift register 100, in turn causes the $Q_1$-$Q_N$ stages of the shift register to go low at the edges of 64-68 of waveforms 76-80. The stage $Q_1$ remains low from the activating edge 60 of the first trigger pulse until the first downgoing edge 90 of a shift register 100 clock pulse. Since the stage $Q_1$ is now set the (flip flop) stage can be reset by the application of a downgoing $\overline{Q}$ pulse from the flip flop 122 (which was formerly cleared by the application of the downgoing signal from the shift register 100 to the clear terminal of the flip flop 122). The downgoing pulsed Q output of the flip flop 122 is occasioned by the second or following trigger pulse of leading edge 62 in the same manner as described with respect to the first trigger pulse. Therefore in the same manner as described supra, the stage $Q_1$ will remain low only until the arrival of the next downgoing (trailing) clock pulse edge and, upon its arrival, will remain high. The process of setting the succeeding (cleared) stages $Q_2$, $Q_3$ upon the sequential arrival of additional clock pulses at the terminal 114 of the shift register 100 will proceed as shown in FIG. 5. Thus, the output $\overline{DSS\ OUT}$ will appear as a downgoing pulse which terminates three (the length of the shift register 100) clock pulses after the arrival of (leading edge of) the last VIDEO return.

What is claimed is:

1. A ranging system for providing the range of remote targets comprising:
   (a) transmitting means for transmitting energy pulses to remote targets;
   (b) detector means for receiving portions of the energy pulse reflected by the remote targets and for developing video pulses;
   (c) first and second counters, said second counter coupled to said first counter for being controlled by said first counter when said first counter counts to a predetermined value; and
   (d) digital single shot means responsive to the video pulses from said detecting means for applying reset pulses to said first counter, said digital single shot means including an enabling terminal further comprising first gating means coupled to said first and second counters and to said enabling terminal and responsive to predetermined counts of said counters for developing a pulse for enabling and disabling said digital single shot means.

2. A system for displaying the range of remote targets in space comprising:
   (a) transmitting means for transmitting energy to remote targets, said transmitting means providing a reset signal;

(b) detector means for receiving portions of said energy reflected by the remote targets;

(c) a readout counter coupled to said transmitting means and responsive to said reset signal to be preset, said readout counter providing remote target information;

(d) a timing counter coupled to said readout counter, said timing counter at a full count controlling said readout counter to stop counting and provide range information of the remote target; and (e) a digital single shot circuit including a flip flop and a shift register, said shift register having a plurality of stages coupled to said flip flop for being reset and having at least one stage coupled to said flip flop for clearing said flip flop when said shift register is reset, said flip flop being triggered by said detector means and enabled by a predetermined count of said timing counter, said shift register providing a reset signal to said timing counter.

3. The system of claim 2 further comprising clock oscillating means for providing a source of clock pulses to both said timing counter and to said readout counter and to said shift register.

4. The ranging system of claim 2 further comprising first gating means responsive to predetermined counts of said counters which provide a minimum and maximum range period for enabling said digital single shot circuit.

5. The ranging system of claim 2 further comprising second gating means coupled to said transmitting means and said detector means for developing, a count start signal.

6. The ranging system of claim 5 further comprising third gating means responsive to less than a full count of said second counter or to said count start signal for enabling said first and second counters.

7. The ranging system of claim 2 further including means to disable said digital single shot circuit by a predetermined count of said readout counter.

8. A ranging system for determining the range of a remote target within a selected interval comprising:

(a) means for transmitting energy;

(b) means for detecting the presence of said energy when reflected by a remote target located within said interval and for producing a return pulse signal indicative thereof;

(c) a digital single shot circuit to accept said return pulse signal and to produce an output responsive thereto, said output being a reset pulse;

(d) said digital single shot circuit including means for retriggering so that said digital single shot circuit is activated by and responsive to the application of a second return pulse during the duration of said reset pulse;

(e) a timing counter, said counter being reset by said reset pulse; and (f) a readout counter, said counter being controlled by the count of said timing counter so that the count of said readout counter indicates the range of said target corresponding to the last return pulse signal at the time that said timing counter reaches its maximum count.

9. A ranging system as defined in claim 8 further characterized in that said digital single shot circuit additionally comprises:

(a) a flip flop, the state of said flip flop being controlled by said return pulse during said selected interval;

(b) a shift register, the output of at least one stage of which is utilized to provide said reset pulse;

(c) said shift register being coupled to an output of said flip flop so that the state of at least one stage of said shift register is changed by the change of state of said flip flop; and (d) the output of said at least one stage of said shift register being utilized in turn to change the state of said flip flop so that the state of said flip flop is responsive to each return pulse applied to said digital single shot during said selected interval.

10. A resettable digital single shot circuit which comprises:

(a) a flip flop, said flip flop being transformed from a first state to a second state by the application of a triggering pulse to said digital single shot circuit;

(b) a shift register, the output of at least one stage of said shift register being utilized to produce the output of said digital single shot circuit;

(c) said shift register having a clearing means common to all stages thereof, said clearing means being coupled to an output of said flip flop so that all stages of said shift register are reset upon the transition of said flip flop from said first state to said second state; and (d) the output of said at least one stage of said shift register being utilized in turn to return said flip flop to said first state so that the state of said flip flop is responsive to each triggering pulse applied to said digital single shot circuit, whereby said digital single shot circuit is responsive to all triggering pulses applied thereto.

11. A resettable digital single shot circuit as defined in claim 10 further characterized in that said digital single shot circuit is enabled during selected time intervals, whereby the output of said digital single shot circuit is responsive only to triggering pulses occurring during said selected intervals.

* * * * *